United States Patent [19]

Wimmer et al.

[11] 4,441,737

[45] Apr. 10, 1984

[54] VEHICLE WITH A PASSIVE BELT SYSTEM

[75] Inventors: Robert Wimmer, Ebersberg; Laslo Levai, Munich, both of Fed. Rep. of Germany

[73] Assignee: Bayerische Motoren Werke A.G., Munich, Fed. Rep. of Germany

[21] Appl. No.: 336,387

[22] PCT Filed: May 16, 1981

[86] PCT No.: PCT/EP81/00047

§ 371 Date: Jan. 4, 1982

§ 102(e) Date: Jan. 4, 1982

[87] PCT Pub. No.: WO81/03468

PCT Pub. Date: Dec. 10, 1981

[30] Foreign Application Priority Data

Jun. 3, 1980 [DE] Fed. Rep. of Germany ... 8014800[U]

[51] Int. Cl.³ .............................................. B60R 21/10
[52] U.S. Cl. .................................... 280/804; 297/469
[58] Field of Search ....................... 280/802, 804, 807; 297/469, 473

[56] References Cited

U.S. PATENT DOCUMENTS

| | | | |
|---|---|---|---|
| 4,039,224 | 8/1977 | Bauer | 280/804 |
| 4,093,274 | 6/1978 | Scholz | 280/807 |
| 4,193,613 | 3/1980 | Cachia | 280/804 |
| 4,342,471 | 8/1982 | Stephenson | 280/804 |
| 4,345,781 | 8/1982 | Suzuki | 280/804 |

FOREIGN PATENT DOCUMENTS 2643818 3/1978 Fed. Rep. of Germany .

Primary Examiner—Bruce H. Stoner, Jr.
Assistant Examiner—John A. Carroll
Attorney, Agent, or Firm—Craig & Burns

[57] ABSTRACT

A passive diagonal safety belt is anchored in a vehicle by an automatic roller at the edge of one side door opening and also on the seat in the middle of the vehicle. The safety belt runs over a deflection element, which is arranged at the door post, so that the height can be adjusted in the shoulder region. A transport cable is arranged along the upper edge of the side door opening and is driven when the side door is opened and shut. The cable is connected with the diagonal belt via a carrier which is slidably attached to the belt. So that the passive diagonal safety belt neither contacts the heads of nor hinders the movements of the occupants of the vehicle, the diagonal belt is moved obliquely in a forward and upward direction by the cable. The cable passes over a deflection device when automatically released from the vehicle occupants and is finally placed in a guide along the upper side door opening when a gripper on the transport cable raises the deflection element. When the diagonal belt is attached to the vehicle occupant, the deflection element is lowered and the diagonal belt is put in position from the top in a downward oblique direction.

3 Claims, 4 Drawing Figures

VEHICLE WITH A PASSIVE BELT SYSTEM

BACKGROUND OF THE INVENTION

The present invention relates to a passive belt system for a motor vehicle which is attached by an automatic roller at the edge of a side door opening and on the seat in the middle of the vehicle and runs over a deflection element arranged at the door post allowing the length to be adjusted in the shoulder area.

A passive belt system for a motor vehicle is already known, as in, for example, German Offenlegungsschrift No. 2,643,818. In this system, there is an extension which runs along the upper door opening to the rear door post. When the strap is not in use, it is placed on the extension thereby remaining at the chest level of the passenger. Disadvantageously, when the strap is in use, it is moved vertically near the head of the passenger.

SUMMARY OF THE INVENTION

Accordingly, it is an object of the present invention to provide a seat belt system wherein the seat belt does not come into contact with the head of the vehicle occupant when being placed in position or removed.

Yet another object of the present invention is to provide a diagonal safety belt which, when removed automatically from the vehicle occupant, is first moved obliquely in a forward and upward direction toward the upper end region of the front door post and is finally arranged along the upper door opening by the displacement of the deflection elements in the direction of the wrist brace.

Advantageously, contact of the belt with the head of the vehicle occupant is avoided when the safety belt is removed either in an oblique forward and upward direction or in the reverse direction.

BRIEF DESCRIPTION OF THE DRAWING

These and other objects, features and advantages of the present invention will become more apparent from the following description when taken in connection with the accompanying drawings which show, for the purposes of illustration only, one embodiment in accordance with the present invention, and wherein.

DESCRIPTION OF THE INVENTION

Figure 1:
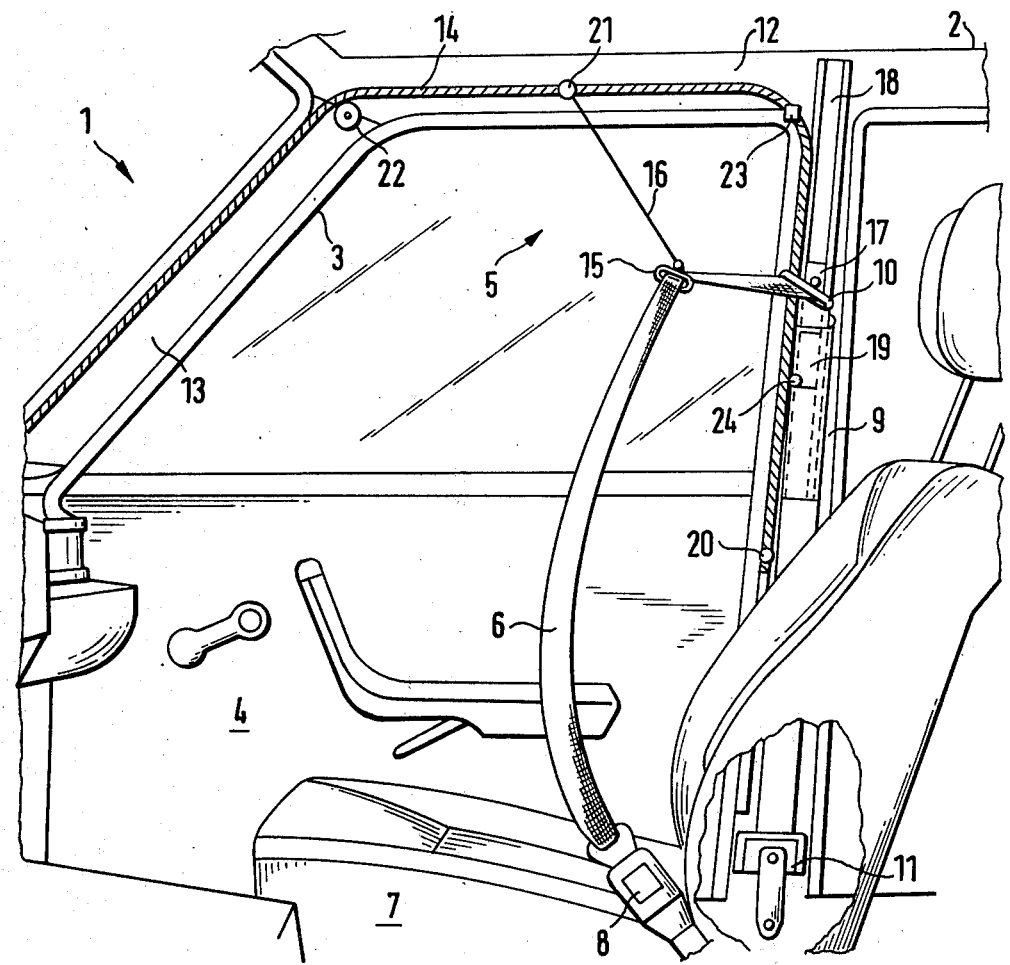
FIG. 1 is a schematic diagram of a passive safety belt system in accordance with the present invention, some parts shown in section.

Referring now to the drawings wherein like reference numerals are used to designate like parts, FIG. 1 shows a diagonal safety belt 6 on the vehicle chassis 2 which can be moved along the upper edge of a door opening 3 of a front side door 4 by means of a device 5 which is essentially controlled by the motions of the side door. The safety belt 6 is affixed in the generally mid plane of the vehicle to a seat 7 by means of a lock 8 and runs to an automatic roller 11 which is arranged in the rear door post 9 via a deflection element 10. The deflection element 10 is arranged at the shoulder height of the vehicle occupant on the rear door post 9 such that the height can be adjusted. The deflection element 10 is a conventional continuous brace. The device 5 features a transport cable 14 along the door opening 3 which is delineated by the rear door post 9, the upper wrist brace 12 and the front door post 13. The transport cable 14 is preferably a flexible toothed rack which is directed through a tube which is slit lengthwise. The transport cable 14 interacts with an electrical drive (not shown) which is controlled by switches (not shown) activated by the motions of the side door 4.

FIG. 1 shows a carrier 15 arranged at the safety belt 6 between the lock 8 and the deflection element 10 and connected so that it can glide along with the safety belt 6. The carrier 15 is connected solidly with the transport or conveying cable 14 by means of a cable 16 which has a constant length. As FIG. 1 also shows the deflection element 10 is connected with a slide 17 which is arranged so that it can be moved in a guide 18. The guide 18 is extended from the shoulder height region beyond the upper end region of the rear door post 9. The slide 17 is associated with a movable stop 19 which can be locked in the guide 18. The stop 19 is used to adjust the height of the deflection element 10 to the shoulder height of the vehicle occupant in order to ensure a favorable path for the safety belt 6 over the shoulder of the vehicle occupant. For displacement into the upper end region of the door post 9, the slide 17 interacts with a gripper 20 which is arranged at the transport cable 14 at a set distance from the coupling 21 of the cable 16. A deflection device 22 which is solidly fixed to the chassis is provided for the cable 16 in the upper end region of the front door post 13. The deflection device can be designed, for example, as a roller.

Figure 2:
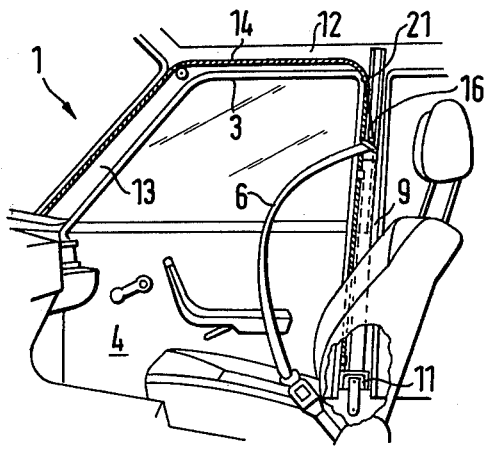
FIG. 2 illustrates the path of the safety belt either after attachment or prior to removal of the belt.

FIG. 2 shows the placement of the diagonal safety belt 6 on a vehicle occupant, not shown, either after attachment or prior to removal of the belt. The coupling 21 of the cable 16 at the transport cable 14 is located in the area of the rear door post 9 so that the cable 16 runs to the carrier 15 outside of the door opening 3 adjacent to door post 9.

Figure 3:
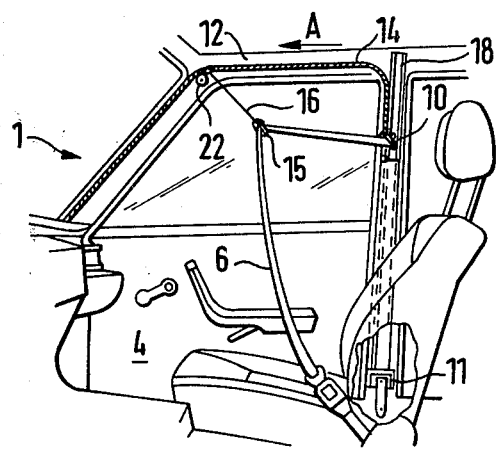
FIG. 3 illustrates the path of the safety belt when the switch is activated.

Opening the side door 4 activates a switch (not shown) which controls the electrical drive of the transport cable 14 so that the transport cable 14 moves in the direction of arrow A in FIG. 3. Coupling 21 of the cable 16 is then displaced along the roof beam 12 so that cable 16, which is of constant length, removes the safety belt 6 from the vehicle occupant in an oblique forward and upward direction as shown in FIG. 3.

Figure 4:
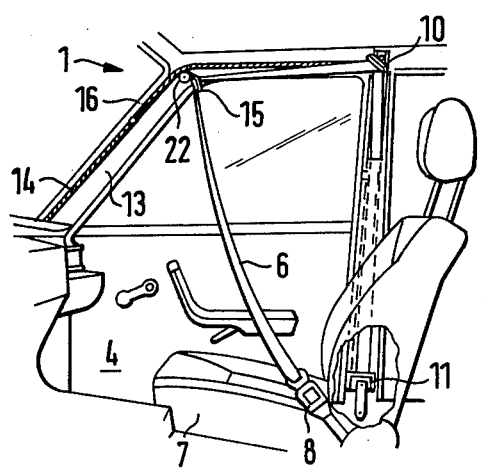
FIG. 4 illustrates the path of the safety belt at the point when the desired door opening is reached.

If the cable coupling 21 is displaced further to the front door post 13, the cable 16 is directed over the roller, deflection device 22, causing the safety belt 6 to be removed farther in the forward and upward direction stopping when the door opening 3 is reached, as shown in FIG. 4. About when the deflection of the cable 16 begins, the slide 17, which contains the deflection element 10, is grasped by the gripper 20 on the transport cable 14 and moved into the upper end region of the door post 9 or into the roof beam 12. As FIG. 4 shows a portion of the safety belt 6 remains above the door opening 3 along the roof beam 12 after the safety belt 6 has been finally removed from the vehicle occupant. The actual belt portion of the safety belt 6 runs from the automatic roller 11 via the deflection element 10 on the roof beam 12 to the carrier 15, which is located near the deflection roller 22, to the belt lock 8 at the inside of the seat 7.

When the side doors 4 are closed, the aforementioned process runs in the opposite direction so that a cam 23, which is arranged at the transport or conveying cable 14, terminates the process by activating an end switch 24 at the stop 19. Thus, the actuation of a limit switch by a cam arranged at the conveying cable is used for switching off the electrical drive for the conveying cable.

The indirect connection of the safety belt 6 with the transport cable 14 via the cable 16 guarantees that the safety belt will not come into contact with the head of the vehicle occupant during both the initial phase of removing the safety belt 6 and during the final phase of attaching the safety belt 6.

While we have shown and described one embodiment in accordance with the present invention, it is understood that the same is not limited thereto but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A passive safety belt system for a motor vehicle having:
   a diagonal safety belt, which is movable along the upper edge of a door opening of a front side door of the vehicle, and is affixed in the generally midplane area of the vehicle to a seat by a locking means;
   transport means controlling the movement of the safety belt said transport means are activated by the motions of the side door of the vehicle;
   a deflection element contained in a rear door post for adjusting the length of the safety belt to match the shoulder height of the vehicle occupant;
   an automatic roller contained in the rear door post;
   a carrier slidably carried by the safety belt; wherein:
      the safety belt passes over the deflection element onto the automatic roller;
      the motions of the side door activate a switch which moves the transport means;
      the transport means is carried by the carrier by a cable having a constant length;
      the deflection element is slidably carried by a guide, which extends from the shoulder height area beyond the upper end region of the rear door post;
      a movable stop means is provided in the guide to lock the safety belt in the guide when adjusting the belt to the shoulder height of the vehicle occupant;
      a gripper is provided in the transport means along the rear door post at a given distance from a coupling point between the transport means and the safety belt;
      said gripper serves to displace the deflection element in the upper end area of the rear door post when the safety belt is released from the vehicle occupant while the transport means is displaced over a second deflection element, which is solidly fastened to the chassis in the upper end of the front door post.

2. The passive safety belt system according to claim 1, wherein the deflection device is a roller.

3. The passive safety belt system according to claim 1, wherein an end switch is provided on the stop means, which is activated by a cam located at the transport means which terminates the motion of the safety belt.

* * * * *